United States Patent
Nakano

(10) Patent No.: US 9,967,429 B2
(45) Date of Patent: May 8, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Toshimitsu Nakano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/381,991

(22) Filed: Dec. 16, 2016

(65) Prior Publication Data

US 2017/0208211 A1    Jul. 20, 2017

(30) Foreign Application Priority Data

Jan. 19, 2016    (JP) .................................. 2016-007999

(51) Int. Cl.
*H04N 1/40*    (2006.01)
*H04N 1/405*    (2006.01)
*H04N 1/409*    (2006.01)

(52) U.S. Cl.
CPC ........... *H04N 1/4053* (2013.01); *H04N 1/409* (2013.01); *H04N 1/40037* (2013.01); *H04N 1/4055* (2013.01); *H04N 1/4058* (2013.01); *H04N 1/40068* (2013.01); *H04N 2201/0094* (2013.01); *H04N 2201/04781* (2013.01); *H04N 2201/04796* (2013.01)

(58) Field of Classification Search
CPC ............. H04N 1/4053; H04N 1/40087; H04N 1/40081
See application file for complete search history.

(56) References Cited

U.S. PATENT DOCUMENTS

| 8,345,309 B2 | 1/2013 | Nakano .......................... 358/1.9 |
| 8,824,015 B2 | 9/2014 | Kashibuchi ................... 358/3.06 |
| 2016/0048099 A1 | 2/2016 | Nakano ................. G03G 15/553 |

FOREIGN PATENT DOCUMENTS

| JP | H04-336859 | 11/1992 |
| JP | 2004-170755 | 6/2004 |
| JP | 2013-236180 | 11/2013 |

*Primary Examiner* — Christopher D Wait
(74) *Attorney, Agent, or Firm* — Fitzpatrick, Cella, Harper & Scinto

(57) ABSTRACT

An image processing apparatus including: a halftone processing unit configured to generate halftone image data represented by a halftone dot corresponding to a density value by performing halftone processing using a dither matrix for input image data; a phase change processing unit configured to correct a deviation of a laser beam scan line that is used in forming an image in accordance with the input image data on a printing medium by performing phase change processing to shift the phase of a pixel in the halftone image data in a sub scanning direction; and a pseudo high-resolution processing unit configured to convert the halftone image data after the phase change processing into halftone image data with a lower resolution by performing pseudo high-resolution processing, and in the dither matrix, threshold values are arranged so that the number of pixels in the sub scanning direction, which make up the halftone dot, is always even.

17 Claims, 15 Drawing Sheets

| 21 | 36 | 64 | 107 | 175 | 215 | 222 | 218 | 182 | 143 | 57 | 29 |
|---|---|---|---|---|---|---|---|---|---|---|---|
| 72 | 86 | 100 | 111 | 129 | 154 | 161 | 165 | 157 | 147 | 93 | 79 |
| 190 | 179 | 168 | 114 | 93 | 79 | 72 | 86 | 100 | 150 | 172 | 186 |
| 233 | 225 | 193 | 118 | 57 | 29 | 21 | 36 | 64 | 140 | 197 | 229 |
| 254 | 243 | 207 | 122 | 43 | 7 | 0 | 14 | 50 | 132 | 204 | 247 |
| 250 | 240 | 211 | 136 | 43 | 7 | 0 | 14 | 50 | 125 | 200 | 236 |
| 222 | 218 | 182 | 143 | 57 | 29 | 21 | 36 | 64 | 107 | 175 | 215 |
| 161 | 165 | 157 | 147 | 93 | 79 | 72 | 86 | 100 | 111 | 129 | 154 |
| 72 | 86 | 100 | 150 | 172 | 186 | 190 | 179 | 168 | 114 | 93 | 79 |
| 21 | 36 | 64 | 140 | 197 | 229 | 233 | 225 | 193 | 118 | 57 | 29 |
| 0 | 14 | 50 | 132 | 204 | 247 | 254 | 243 | 207 | 122 | 43 | 7 |
| 0 | 14 | 50 | 125 | 200 | 236 | 250 | 240 | 211 | 136 | 43 | 7 |

SUB SCAN ↑

MAIN SCAN →

| CHANGE POINT | P1 | P2 | P3 | P4 | P5 | P6 | P7 | ..... | Pn |
|---|---|---|---|---|---|---|---|---|---|
| DIRECTION | ↑ | ↑ | ↑ | ↓ | ↓ | ↓ | ↓ | ..... | ↓ |

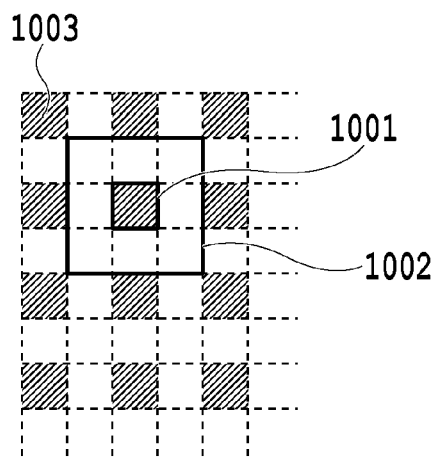
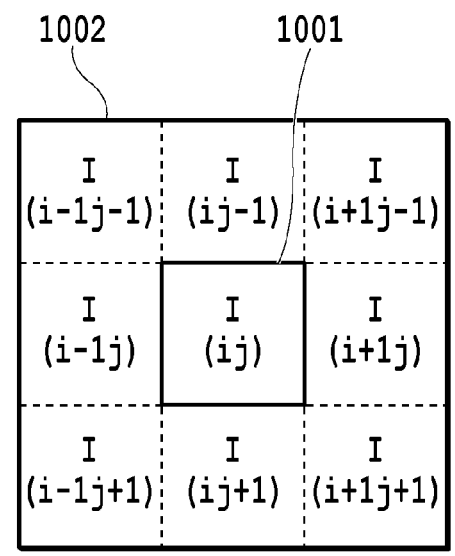
FIG.6A  FIG.6B
FIG.6C  FIG.6D

FIG.8A

| 21 | 36 | 64 | 107 | 175 | 215 | 222 | 218 | 182 | 143 | 57 | 29 |
|---|---|---|---|---|---|---|---|---|---|---|---|
| 72 | 86 | 100 | 111 | 129 | 154 | 161 | 165 | 157 | 147 | 93 | 79 |
| 190 | 179 | 168 | 114 | 93 | 79 | 72 | 86 | 100 | 150 | 172 | 186 |
| 233 | 225 | 193 | 118 | 57 | 29 | 21 | 36 | 64 | 140 | 197 | 229 |
| 254 | 243 | 207 | 122 | 43 | 7 | 0 | 14 | 50 | 132 | 204 | 247 |
| 250 | 240 | 211 | 136 | 43 | 7 | 0 | 14 | 50 | 125 | 200 | 236 |
| 222 | 218 | 182 | 143 | 57 | 29 | 21 | 36 | 64 | 107 | 175 | 215 |
| 161 | 165 | 157 | 147 | 93 | 79 | 72 | 86 | 100 | 111 | 129 | 154 |
| 72 | 86 | 100 | 150 | 172 | 186 | 190 | 179 | 168 | 114 | 93 | 79 |
| 21 | 36 | 64 | 140 | 197 | 229 | 233 | 225 | 193 | 118 | 57 | 29 |
| 0 | 14 | 50 | 132 | 204 | 247 | 254 | 243 | 207 | 122 | 43 | 7 |
| 0 | 14 | 50 | 125 | 200 | 236 | 250 | 240 | 211 | 136 | 43 | 7 |

SUB SCAN ↑
MAIN SCAN →

FIG.8B

| 32 | 36 | 68 | 104 | 175 | 215 | 222 | 218 | 182 | 143 | 79 | 39 |
|---|---|---|---|---|---|---|---|---|---|---|---|
| 93 | 89 | 97 | 107 | 129 | 154 | 161 | 165 | 157 | 147 | 118 | 100 |
| 190 | 179 | 168 | 111 | 82 | 72 | 64 | 75 | 86 | 150 | 172 | 186 |
| 233 | 225 | 193 | 114 | 57 | 25 | 21 | 29 | 61 | 140 | 197 | 229 |
| 254 | 243 | 207 | 122 | 43 | 7 | 0 | 14 | 47 | 132 | 204 | 247 |
| 250 | 240 | 211 | 136 | 54 | 11 | 4 | 18 | 50 | 125 | 200 | 236 |
| 222 | 218 | 182 | 143 | 79 | 39 | 32 | 36 | 68 | 104 | 175 | 215 |
| 161 | 165 | 157 | 147 | 118 | 100 | 93 | 89 | 97 | 107 | 129 | 154 |
| 64 | 75 | 86 | 150 | 172 | 186 | 190 | 179 | 168 | 111 | 82 | 72 |
| 21 | 29 | 61 | 140 | 197 | 229 | 233 | 225 | 193 | 114 | 57 | 25 |
| 0 | 14 | 47 | 132 | 204 | 247 | 254 | 243 | 207 | 122 | 43 | 7 |
| 4 | 18 | 50 | 125 | 200 | 236 | 250 | 240 | 211 | 136 | 54 | 11 |

SUB SCAN ↑
MAIN SCAN →

CONFIGURATION
OF PIXEL VALUES
OF DOT PATTERN
IS DIFFERENT

IMAGE PROCESSING APPARATUS, IMAGE PROCESSING METHOD, AND STORAGE MEDIUM

BACKGROUND OF THE INVENTION

Field of the Invention

The present invention relates to an image processing technique to eliminate unevenness in density of an image.

Description of the Related Art

As an image printing system that is used in a color image forming apparatus, such as a color printer and a color copy machine, an electrophotographic system is known. In the electrophotographic system, a latent image is formed by exposing a photoconductor drum to laser beams or by a light-emitting element, such as an LED, and the latent image is developed by toner, which is a charged color material. An image is printed by transferring the image developed by toner to a printing medium, such as paper, and fixing the image. As an electrophotographic image forming apparatus, there is a tandem color image forming apparatus that includes development counters and photoconductor drums in the same number as that of toner colors and which sequentially transfers images of different color planes onto an image conveyance belt or onto a printing medium. In the tandem color image forming apparatus, it is known that a deviation of position (called "registration deviation") in an image for each color component occurs. As a method of suppressing the registration deviation, there is a technique to correct image data by measuring the magnitudes of inclination and bend of a laser beam scan line by using an optical sensor and cancelling out them (e.g., see Japanese Patent Laid-Open No. 2004-170755). In this technique, processing to shift the pixel within image data in the sub scanning direction by one pixel each time (phase change processing) is performed.

In the recent image forming apparatus, it is common to perform printing by developing print data (PDL data) from a host computer into bitmap data. In the case where development into bitmap data is performed with a resolution higher than the resolution of the image forming apparatus, a method is known which reproduces an image with a high resolution in a pseudo manner by using a spot multiplexing technique (e.g., see Japanese Patent Laid-Open No. H04-336859(1992)). The spot multiplexing technique is a technique to form a dot with a resolution higher than the resolution of the image forming apparatus by forming dots that overlap each other at an intermediate potential level for adjacent pixels to turn the potential level at the overlapping portion to a high level.

Here, in the case where the method of Japanese Patent Laid-Open NO. 2004-170755 which corrects image data so as to cancel out distortion resulting from the bend of a scan line and the method of Japanese Patent Laid-Open No. H04-336859(1992) which reproduces an image with a high resolution in a pseudo manner by making use of spot multiplexing are made use of at the same time, there is a possibility that unevenness occurs in an image on a printing medium. The reason is as follows. To begin with, the above-described phase change processing causes a difference in the pixel position. In order to reduce the difference in the pixel position, it is sufficient to perform the phase change processing for image data with a higher resolution. Consequently, it is considered to perform, after performing the phase change processing for image data with a high resolution, processing to convert the image data after the processing into image data with a low resolution for the above-described spot multiplexing. However, in this case, in the image data after the conversion into a low resolution, the kind and shape of halftone dots that appear change with the position in the main scanning direction at which the difference in the pixel position occurs due to the phase change processing as a boundary. As a result of this, unevenness in color occurs in the image on the printing medium. For this problem, a technique has been proposed which suppresses a change in density from occurring before and after the phase change processing by limiting two vector components representing the period of halftone dot to a combination of an even number and an odd number in the dither matrix that is used in halftone processing (see Japanese Patent Laid-Open No. 2013-236180).

As described above, in the case where image data is converted into image data with a low resolution by pseudo high-resolution processing after performing the halftone processing and the phase change processing with a high resolution, with a conventional common dither matrix, unevenness occurs in an image on a printing medium. The above-described technique of Japanese Patent Laid-Open No. 2013-236180 resolves this problem under a certain condition, but the screen ruling and the angle of the dither matrix that is used are restricted and there is a case where moire between colors occurs.

SUMMARY OF THE INVENTION

The image processing apparatus according to the present invention includes: a halftone processing unit configured to generate halftone image data represented by a halftone dot corresponding to a density value by performing halftone processing using a dither matrix for input image data; a phase change processing unit configured to correct a deviation of a laser beam scan line that is used in forming an image in accordance with the input image data on a printing medium by performing phase change processing to shift a phase of a pixel in the halftone image data in a sub scanning direction; and a pseudo high-resolution processing unit configured to convert halftone image data after the phase change processing into halftone image data with a lower resolution by performing pseudo high-resolution processing, and in the dither matrix, threshold values are arranged so that the number of pixels in the sub scanning direction, which make up the halftone dot, is always even.

Further features of the present invention will become apparent from the following description of exemplary embodiments (with reference to the attached drawings).

BRIEF DESCRIPTION OF THE DRAWINGS

FIG. 6A is a diagram showing processing-target pixels and a processing square in bitmap data to which pseudo high-resolution processing is applied, FIG. 6B is an enlarged view of the processing square, FIG. 6C is a conceptual diagram of a multivalued filter corresponding to the processing square, and FIG. 6D is a diagram showing a specific example of a product sum operation coefficient;

FIG. 8A is a diagram showing an example of a dither matrix according to a first embodiment and FIG. 8B is a diagram showing an example of a conventional common dither matrix;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment (Image Processing System)

Figure 1:
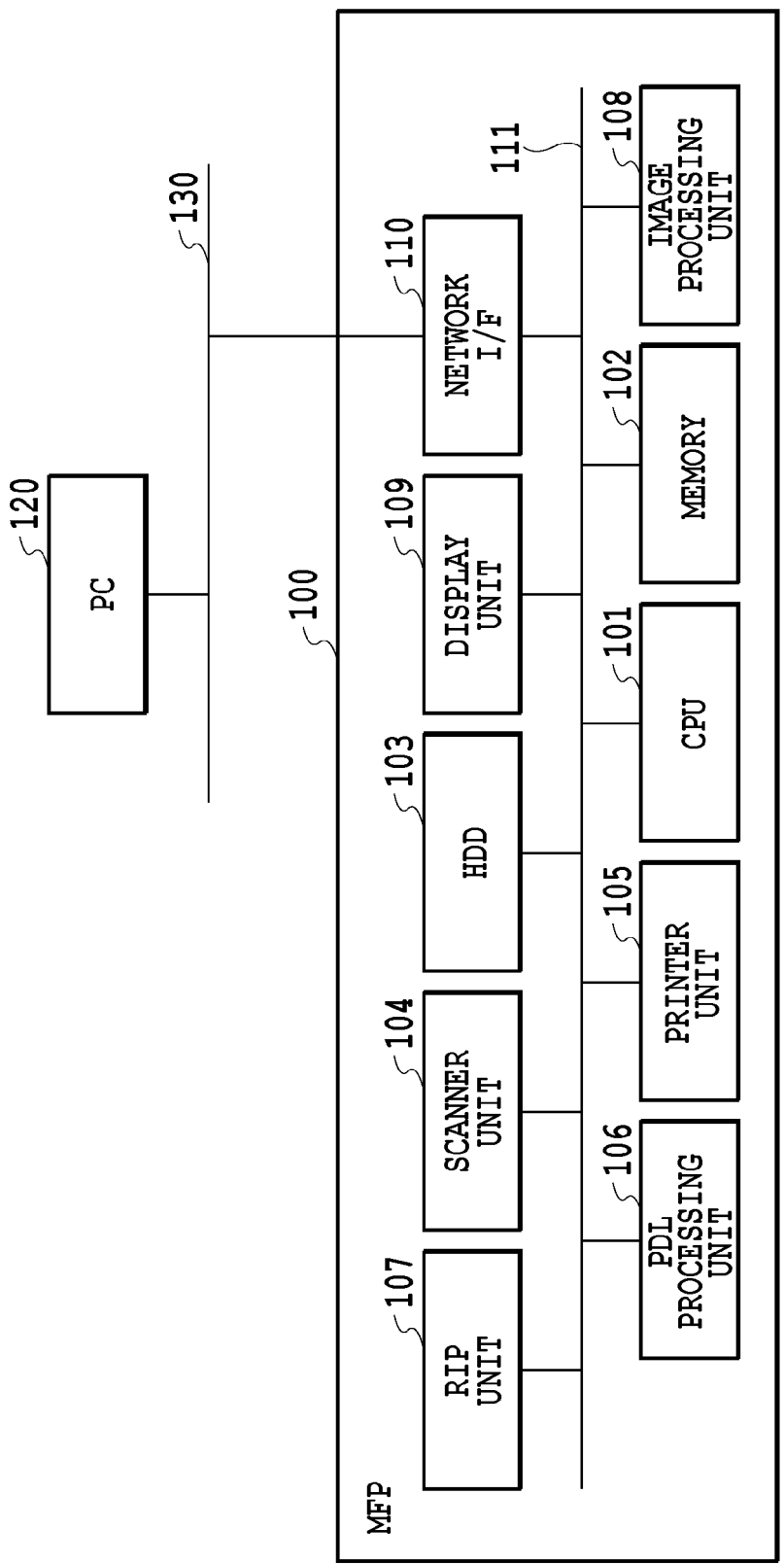
FIG. 1 is a block diagram showing an example of a configuration of a printing system.

In the present embodiment, explanation is given by taking an example of a multi function peripheral (MFP) including a plurality of functions, such as a copy function and a printer function, as a color image forming apparatus. FIG. 1 is a block diagram showing an example of a configuration of a printing system according to the present embodiment. The printing system in FIG. 1 includes an MFP 100 and a PC 120 and the MFP 100 and the PC 120 are connected to each other via a network 130, such as a LAN.

The MFP 100 includes a CPU 101, a memory 102, an HDD 103, a scanner unit 104, a printer unit 105, a PDL processing unit 106, an RIP unit 107, an image processing unit 108, a display unit 109, and a network I/F 110. Then, each unit is connected to one another via an internal bus 111.

The CPU 101 is a processor that centralizedly controls the MFP 100. The memory 102 includes a ROM that stores various commands (including application programs) executed by the CPU 101 to control the MFP 100 and various kinds of data, and a RAM that functions as a work area of the CPU 101. The HDD 103 is a large-capacity storage medium that saves various programs, image data, etc. The scanner unit 104 optically reads a document that is set on a document table or the like, not shown schematically, and acquires image data in the bitmap format.

The PDL processing unit 106 analyzes PDL data included in a print job received from the PC 120 and generates a DL (display list) as intermediate data. The generated DL is sent to the RIP unit 107. The RIP unit 107 performs rendering processing based on the received DL and generates contone (multivalued) bitmap image data. The contone bitmap image data is image data having an 8-bit or 10-bit depth and multiple tone levels, and which represents colors in a color space, such as an RGB color space, and which has information on these colors for each discrete pixel. Specifically, drawing bitmap data and attribute bitmap data are generated respectively. Prior to the generation of the data, the attribute information on a drawing target object is generated for each pixel. The attribute information in this case is determined in accordance with the following criteria.

In the case of being specified by a character drawing command (character kind or character code): text attribute In the case of being specified by a line drawing command (coordinate point, length, thickness): line attribute In the case of being specified by a graphics drawing command (square, shape, coordinate point): graphics attribute In the case of being specified by an image drawing command (set of points): image attribute Then, from the attribute information, pixels that are drawn in accordance with the processing resolution of the printer unit 105 are formed and drawing bitmap data in which information (multivalued) on the color to be drawn in each pixel is input is generated. In the present embodiment, it is premised that the pseudo high-resolution processing to draw a dot whose resolution (e.g., 1,200 dpi) is higher than the resolution (e.g., 600 dpi) of the printer unit 105 is performed. Consequently, the resolution of the drawing bitmap data that is generated here will be 1,200 dpi. Further, attribute bitmap data storing attribute information for each pixel is generated so as to correspond to each pixel of the drawing bitmap. The generated drawing bitmap and attribute bitmap are stored temporarily in the memory 102 or the HDD 103, or sent to the image processing unit 108.

The image processing unit 108 performs necessary image processing for the bitmap format image data to be printed in relation to the print job from the PC 120 or optically read by the scanner unit 104. Details of the image processing unit 108 will be described later. The bitmap format image data after the image processing is sent to the printer unit 105.

The printer unit 105 forms an electrostatic latent image by irradiating exposure light in accordance with the image data generated by the image processing unit 108 and forms a single color toner image by developing the electrostatic latent image. Then, the printer unit 105 forms a multicolored toner image by superimposing the single color toner images and forms a color image on a printing medium by transferring the multicolored toner image onto the printing medium (sheet) and fixing the multicolored toner image.

The display unit 109 includes a liquid crystal panel or the like having a touch screen function and on which various kinds of information are displayed, and in addition, a user performs various operations and gives various instructions via a screen displayed on the display unit 109. The network interface 110 is an interface for performing communication, such as transmission and reception, of a print job with the PC 120 connected via the network 130.

The components of the image forming apparatus are not limited to the above-described contents. For example, it may also be possible to provide an input unit including a mouse, a keyboard, etc., for a user to perform various operations in place of a touch screen, and to the configuration of the image forming apparatus, a component may be added appropriately and the configuration may be changed appropriately in accordance with the purpose of use or the like thereof.

Figure 2:
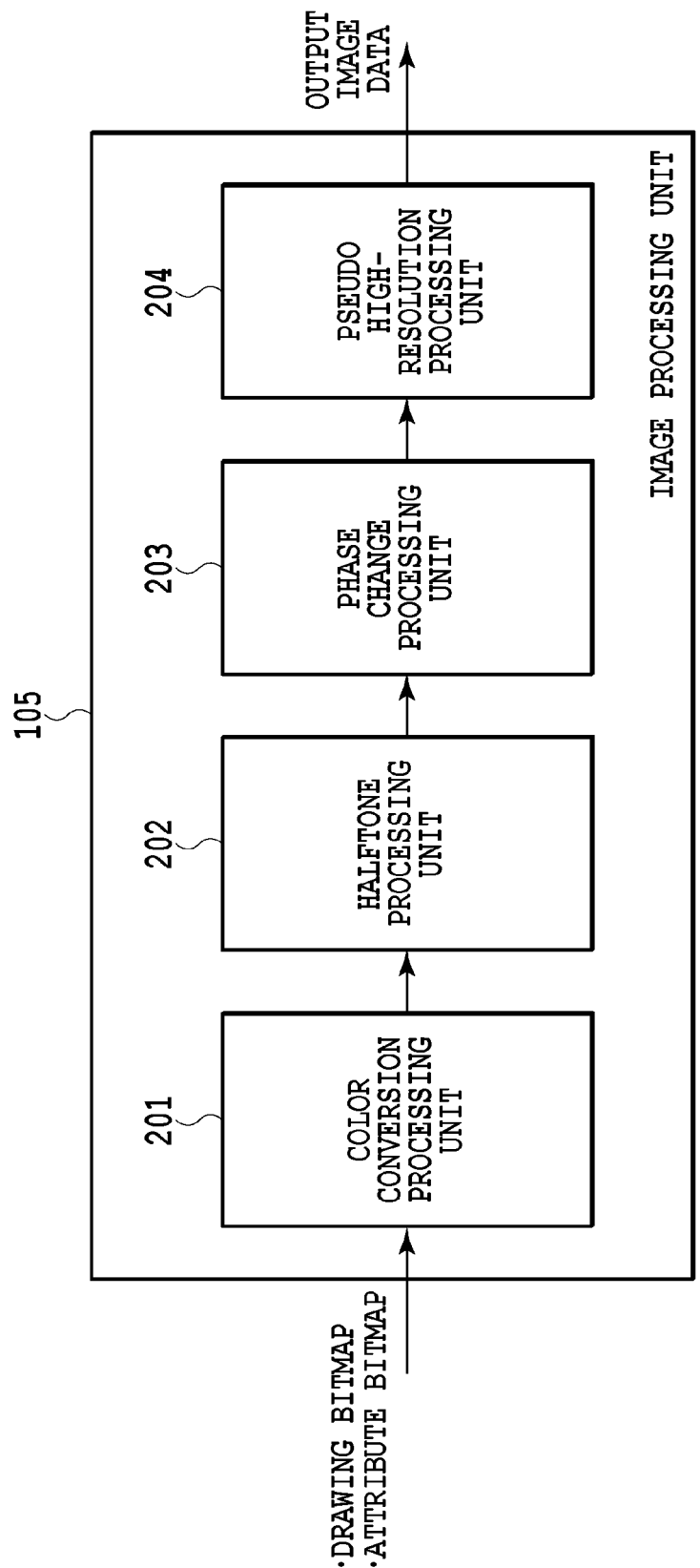
FIG. 2 is a block diagram showing an internal configuration of an image processing unit.

FIG. 2 is a block diagram showing an internal configuration of the image processing unit 108. The image processing unit 108 includes a color conversion processing unit 201, a halftone processing unit 202, a phase change processing unit 203, and a pseudo high-resolution processing unit 204. In the following, each processing unit is explained.

The color conversion processing unit 201 performs color conversion processing to convert a color space of input image data into a color space compatible with the printer unit 105. In the case where the printer unit 105 is a four-color four-drum tandem printer unit that uses toner of four colors in total, i.e., cyan (C), magenta (M), yellow (Y), and black (K), the color space is converted into a CMYK color space.

The halftone processing unit 202 performs pseudo halftone processing by the dither method for each color plane for the image data whose color space has been converted into a color space compatible with the printer unit 105. The dither method uses a threshold value matrix (dither matrix) in which different threshold values are arranged within a matrix having a predetermined size. The halftone processing unit 202 sequentially develops the dither matrix on the multivalued bitmap data, which is input image data, in the form of tile and compares the threshold value with the input pixel value. The halftone processing unit 202 turns ON the pixel in the case where the results of the comparison indicate that the input pixel value is greater than the threshold value, and turns OFF the pixel in the case where the input pixel value is less than or equal to the threshold value, and thus represents a pseudo halftone image. By the halftone processing, the input image data with continuous gradation (multivalued bitmap data) is converted into halftone image data with area gradation made up of halftone dots (binary bitmap data). It may also be possible to use a different dither matrix for each color plane. The feature of the present invention lies in the dither matrix, and details will be described later.

Figure 3A:
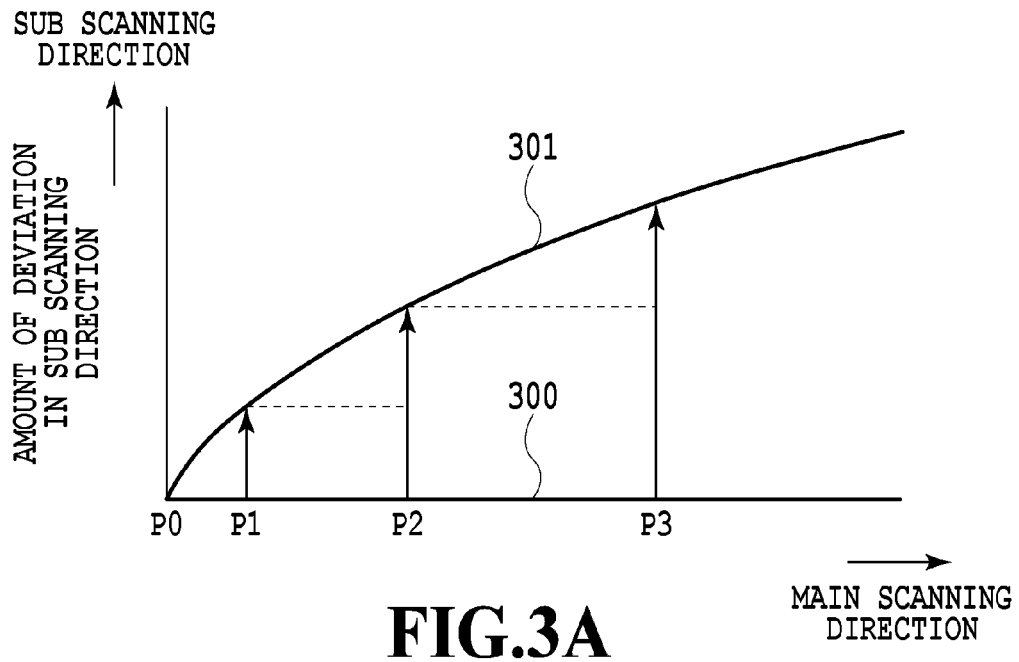
FIG. 3A and FIG. 3B are each a diagram showing an example of bend characteristics of a laser beam scan line.
Figure 3B:
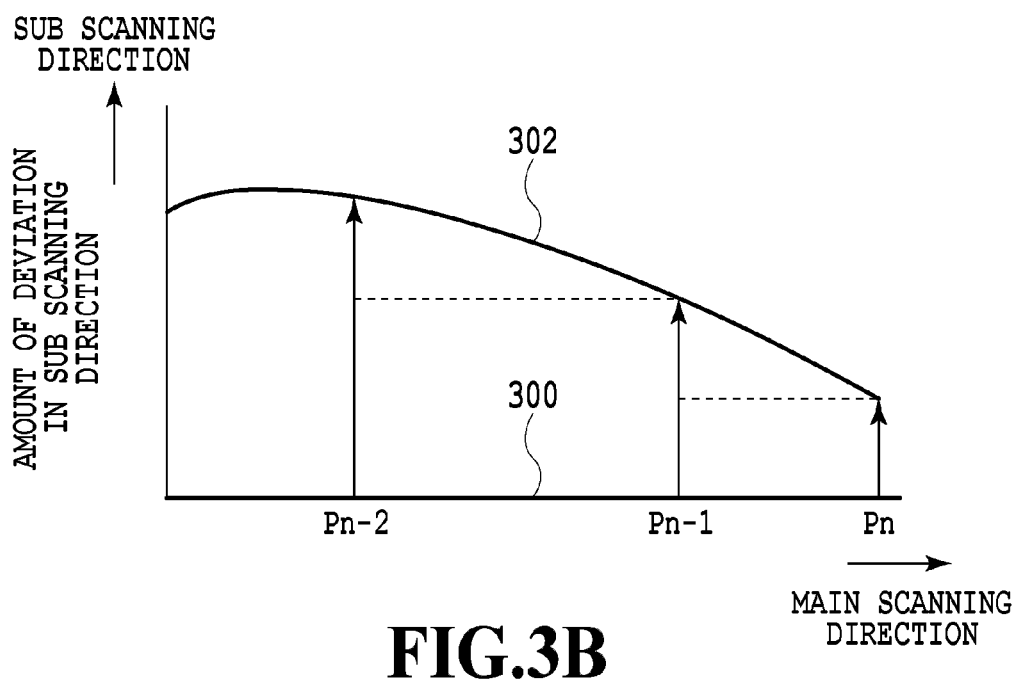
Figure 4A:
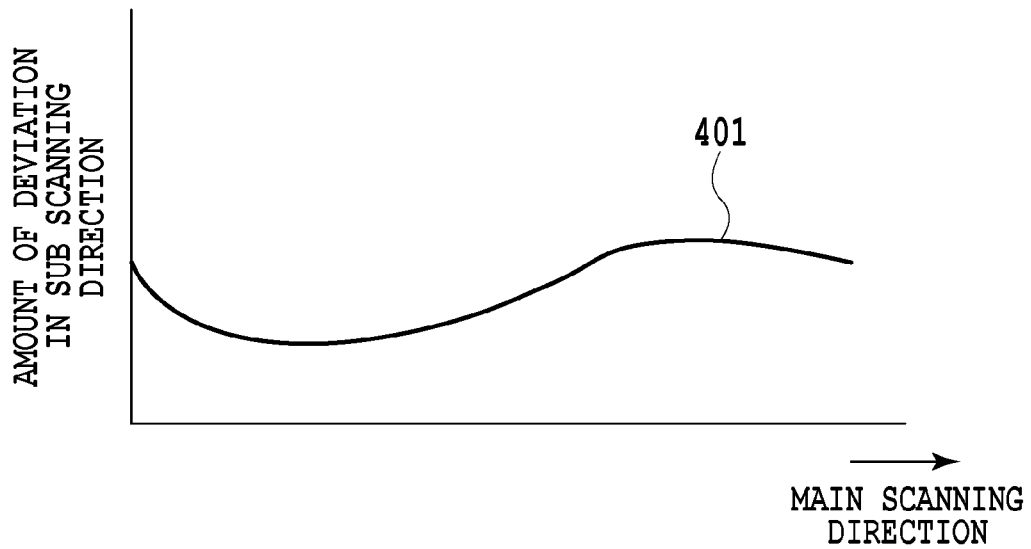
FIG. 4A is a diagram showing bend characteristics of a laser beam scan line and FIG. 4B is a diagram showing an amount of correction in the case where the bend characteristics in FIG. 4A are corrected.
Figure 4B:
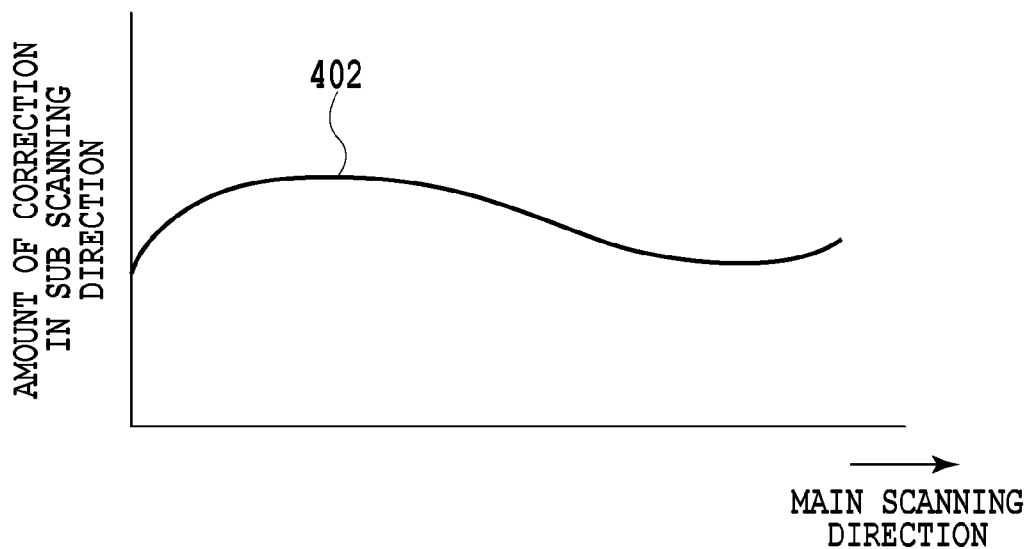
Figures 5A, 5B:
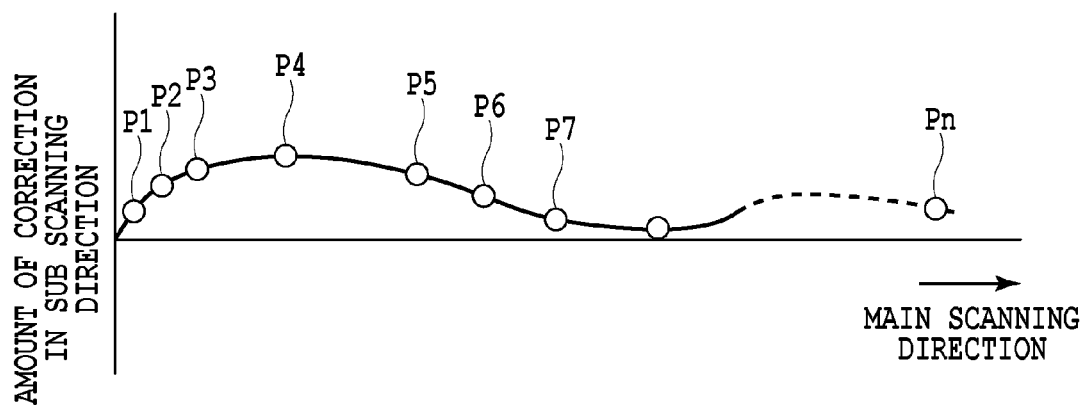
FIG. 5A and FIG. 5B are diagrams showing an example of correction data that is used in phase change processing.

The phase change processing unit 203 corrects the deviation (bend) of the laser beam scan line of each color of CMYK by performing line shift processing to shift the line of the image data (here, binary bitmap data) after the halftone processing in the sub scanning direction. This line shift processing is also called "phase change processing". FIG. 3A and FIG. 3B are diagrams both showing an example of the bend characteristics of the laser beam scan line. In FIG. 3A, a curve 301 indicates characteristics in the case where the laser beam scan line deviates upward in the sub scanning direction (conveyance direction of a sheet) as the laser beam scan line advances in the main scanning direction. In FIG. 3B, a curve 302 indicates characteristics in the case where the laser beam scan line deviates downward in the sub scanning direction as the laser beam scan line advances in the main scanning direction. Then, in FIG. 3A and FIG. 3B, a straight line 300 indicates ideal characteristics of the scan line in the case where a scan is perform in the direction perpendicular to the sub scanning direction, which does not deviate in the sub scanning direction as the laser beam scan line advances in the main scanning direction. FIG. 4A is a diagram showing the bend characteristics (amount of deviation) of the laser beam scan line and a curve 401 indicates the bend characteristics of the laser beam corresponding to the main scan width. On the other hand, FIG. 4B is a diagram showing an amount of correction (correction characteristics) at the time of correcting the bend characteristics in FIG. 4A and it is known that the correction characteristics indicated by a curve 402 are opposite characteristics so as to cancel out the bend characteristics of the curve 401. FIG. 5A and FIG. 5B show an example of specific correction values (correction data) that are used in the phase change processing and in FIG. 5A, the vertical axis represents the amount of correction and the horizontal axis represents the pixel position in the main scanning direction. In FIG. 5A, each of $P_1, P_2, \ldots P_n$ indicates a point (change point) at which the scan line deviates by one pixel in the sub scanning direction due to the above-described bend characteristics. The pixel position of the change point in the main scanning direction is sometimes called the "change position" or "correction position". FIG. 5B shows the direction in which the scan line up to the next change point is shifted at each of the change points $P_1, P_2, \ldots P_n$. The shift direction at the change point includes the upward direction and the downward direction. For example, the change point $P_2$ is a point at which the line should be further shifted by one pixel in the upward direction up to the next change point $P_3$. Consequently, the change direction at $P_2$ is the upward direction (↑). Similarly, at $P_3$ also, the change direction is the upward direction up to the next change point $P_4$. The change direction at the change point $P_4$ is the downward direction (↓) different from the previously described direction.

The pseudo high-resolution processing unit 204 performs processing (pseudo high-resolution processing) to convert the halftone image data after the phase change processing into data representing a high resolution in a pseudo manner by reducing the resolution. By this pseudo high-resolution processing, the bitmap data with a comparatively high resolution (e.g., 1,200 dpi) at the time of the halftone processing is converted into bitmap data with a lower resolution (e.g., 600 dpi) of the printer unit 105 both in the main scanning direction and in the sub scanning direction. FIG. 6A to FIG. 6D are diagrams schematically showing the pseudo high-resolution processing. FIG. 6A shows a processing-target pixel (pixel of interest 1001) and a processing square 1002 in binary bitmap data to which the pseudo high-resolution processing is applied. The pseudo high-resolution processing is performed by performing sampling while shifting the processing square 1002 and by performing a product sum operation using a multivalued filter within the area of the processing square 1002. Here, the processing square 1002 is an area made up of nine pixels in total including the pixel of interest 1001 and eight adjacent pixels. In FIG. 6A, a cell 1003 with slashes indicates the position (sampling position) of the pixel of interest 1001 for which sampling is performed. The arrangement interval (sampling interval) of the sampling position 1003 is determined by the reduction rate of the resolution in the main scanning direction and in the sub scanning direction. In the present embodiment, the resolution conversion is from 1,200 dpi into 600 dpi both in the main scanning direction and in the sub scanning direction, and therefore, the sampling interval is 2 (=1,200/600) pixels, i.e., sampling is performed at every two pixels. Then, FIG. 6B is an enlarged view of the processing square 1002 and FIG. 6C is a conceptual diagram of the multivalued filter corresponding to the processing square 1002. The multivalued filter of the present embodiment has nine product sum operation coefficients a corresponding to each pixel making up the processing square 1002. FIG. 6D is a diagram showing a specific example of the product sum operation coefficient a within the multivalued filter in FIG. 6C. In the case where the coordinates of the pixel of interest 1001 are taken to be (i, j) and the pixel value is taken to be I (i, j), an output value OUT, which is the results of the product sum operation, is found by expression (1) below.

$$\text{OUT} = \frac{15}{\sum\limits_{k=-1}^{1}\sum\limits_{l=-1}^{1} a_{(k,l)}} \sum\limits_{k=-1}^{1}\sum\limits_{l=-1}^{1} I_{(i+k,j+l)} a_{(k,l)} \qquad \text{expression (1)}$$

The above-described expression (1) means that the product of the pixel value I (i, j) of each pixel, which is represented by two values within the processing square 1002, and the product sum operation coefficient a corresponding to the coordinates is summed for the nine pixels and the sum is normalized with 16 values "0 to 15". Due to this, it is possible to convert the number of tone levels from 2 into 16 while converting the resolution of the image data from 1,200 dpi into 600 dpi. By performing the pseudo high-resolution processing such as this, the effect of spot multiplexing is obtained and it is possible to perform printing with a resolution higher than the actual resolution in a pseudo manner. That is, in the above-described example, it is possible to represent an image whose resolution corresponds to 1,200 dpi by using 600 dpi bitmap data, and therefore, even in the case where the performance of the printer unit 105 is a print resolution of 600 dpi, it is possible to print a character and a line whose resolution corresponds to 1,200 dpi.

Figure 7:
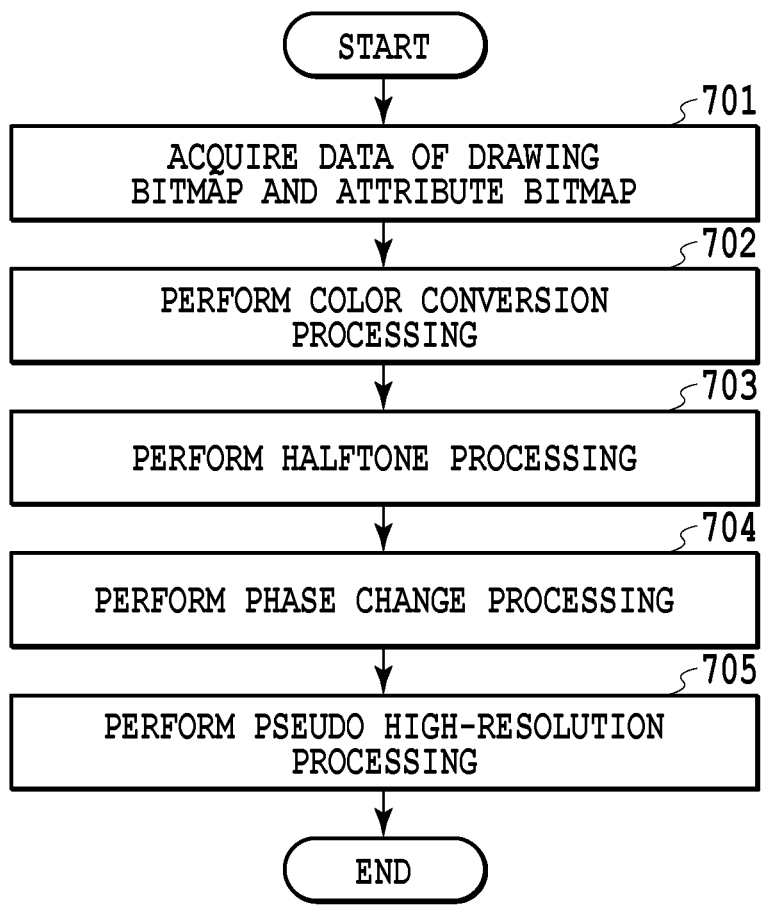
FIG. 7 is a flowchart showing a flow of processing in the image processing unit.

Subsequently, a flow of processing in the image processing unit 108 at the time of the printing processing is explained. FIG. 7 is a flowchart showing the flow of the processing in the image processing unit 108. The series of processing is performed by the CPU 101 reading the computer executable program describing the procedure shown below from the ROM within the memory 102 onto the RAM and then executing the program.

Upon receipt of printing instructions, at step 701, the data of the drawing bitmap and the attribute bitmap generated by the RIP unit 107 is acquired. At step 702, the color conversion processing unit 201 converts a color space (here, RGB) of each pixel of the drawing bitmap into a color space (here, CMYK) compatible with the printer unit 105 by using a color conversion LUT or a matrix arithmetic operation.

Figure 9A:
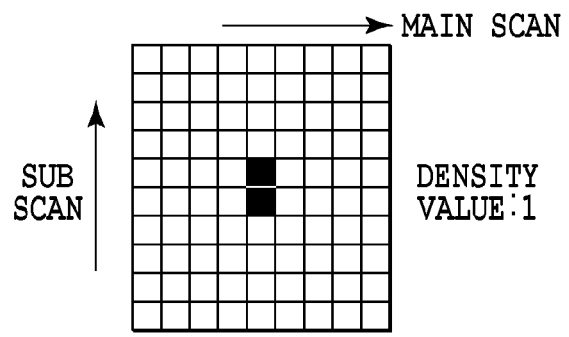
FIG. 9A to FIG. 9E are each a diagram showing a growth process of a halftone dot that is reproduced by the dither matrix shown in FIG. 8A.
Figure 9B:
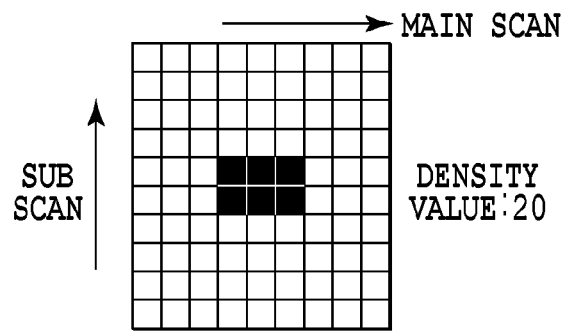
Figure 9C:
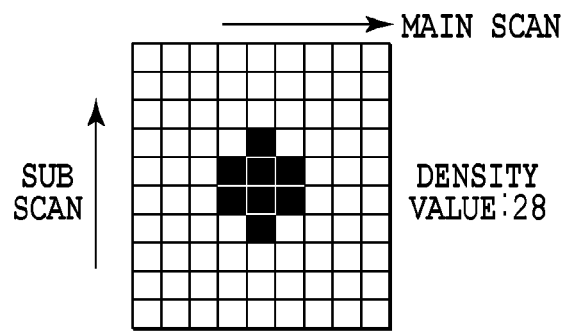
Figure 9D:
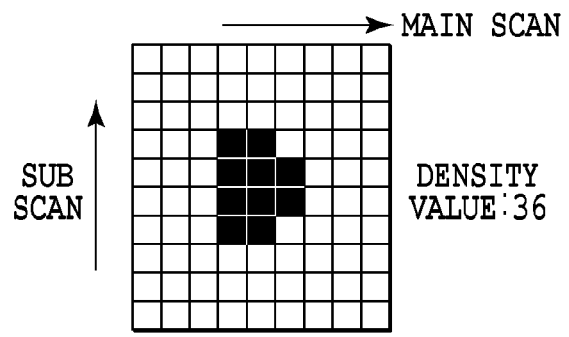
Figure 9E:
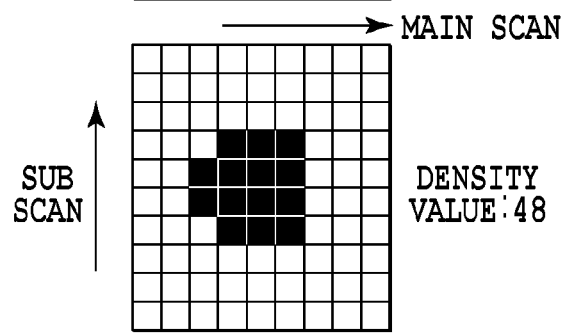
Figure 10A:
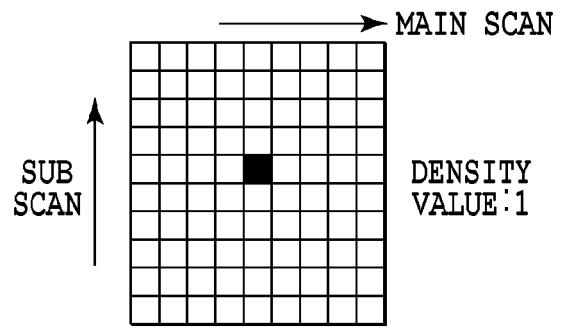
FIG. 10A to FIG. 10E are each a diagram showing a growth process of a halftone dot in the common dither matrix shown in FIG. 8B.
Figure 10B:
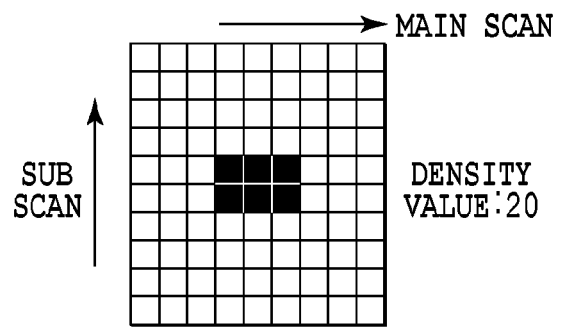
Figure 10C:
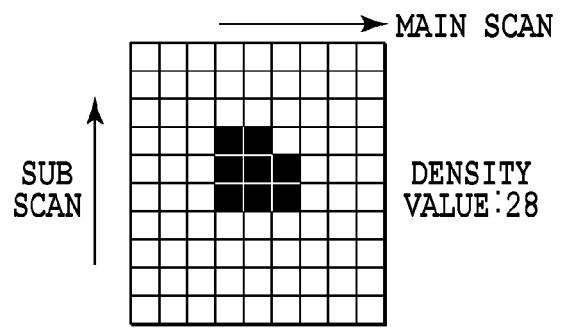
Figure 10D:
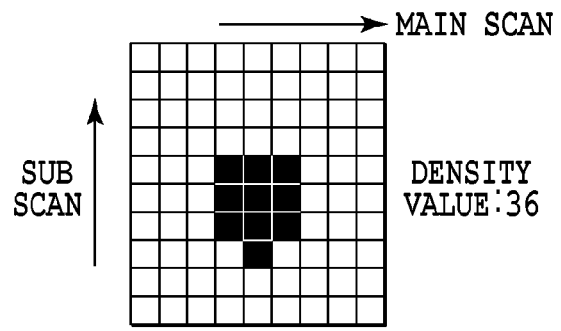
Figure 10E:
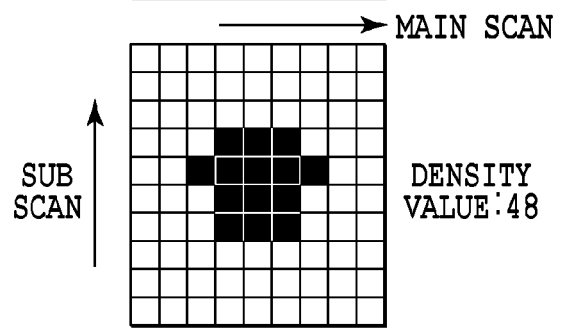

At step 703, the halftone processing unit 202 selects a dither matrix in accordance with the attribute information on each pixel of the attribute bitmap. For example, in the case of the text attribute or line attribute, a high screen ruling dither matrix is selected and in the case of the graphics attribute or image attribute, a low screen ruling dither matrix is selected. FIG. 8A is an example of the dither matrix according to the present embodiment and FIG. 8B is an example of the conventional common dither matrix. The feature of the dither matrix of the present embodiment shown in FIG. 8A lies in that each threshold value is arranged so that the halftone dot that is reproduced in accordance with the density value is always made up of an even number of pixels in the sub scanning direction. In the dither matrix shown in FIG. 8A, the same threshold value (e.g., threshold value "7") is arranged in an even number of pixels successive in the sub scanning direction (vertical direction) and the same threshold value (e.g., threshold value "29") different from the threshold value "7" is arranged in each pixel above and below the successive pixels in the even number. At least part of the threshold values in the dither matrix shown in FIG. 8A are arranged symmetrically with respect to a line in the sub scanning direction (vertical direction) of the dither matrix. FIG. 9A to FIG. 9E are each a diagram showing the growth process of the halftone dot that is reproduced by the dither matrix shown in FIG. 8A. As described above, the halftone dot is made up of pixels (ON pixels) whose pixel value (density value) is greater than the threshold value at the corresponding position of the dither matrix as the results of the comparison between each pixel value of the input image data and the threshold value. The halftone dot in FIG. 9A is the halftone dot in the case where the density value of all the pixels of the input image data is "1" and made up of two pixels in total, i.e., one pixel in the main scanning direction and two pixels in the sub scanning direction. The halftone dot in FIG. 9B is the halftone dot in the case where the density value of all the pixels of the input image data is "20" and made up of six pixels in total, i.e., three pixels in the main scanning direction and two pixels in the sub scanning direction. Similarly, each halftone dot in each of FIG. 9C to FIG. 9E is the halftone dot in the case where the density value of all the pixels of the input image data is "28", "36", and "48", respectively, and made up of four pixels in the sub scanning direction. As described above, in the present embodiment, by using a dither matrix with which the number of pixels in the sub scanning direction of the halftone dot to be formed is even without exception, the halftone processing is performed for each pixel of the drawing bitmap. Due to this, the bitmap data (halftone image data) in which each multivalued pixel value of the drawing bitmap is converted into a binary value is generated.

At step 704, the phase change processing unit 203 corrects the bend of the laser beam scan line by performing the above-described phase change processing for the binary bitmap data (1,200 dpi) after the halftone processing. At step 705, the pseudo high-resolution processing unit 204 generates the multivalued bitmap data whose number of values is greater than two by performing the above-described pseudo high-resolution processing for the binary bitmap data for which the phase change processing has been performed. The generated multivalued bitmap data is sent to the printer unit 105 and subjected to the printing processing.

Here, the effect by the present embodiment is explained in detail. As described above, in the present embodiment, the halftone processing is performed by using the dither matrix in which each threshold value is arranged so that the halftone dot to be reproduced is always made up of an even number of pixels in the sub scanning direction. This dither matrix has the feature that the shape of the halftone dot that appears in an area is not changed from that of the halftone dot that appears in another area adjacent to the former area with the change point as a boundary even in the case where the binary bitmap data is converted into multivalued bitmap data with a low resolution by performing the pseudo high-resolution processing for the binary bitmap data with a high resolution after the phase change processing. Here, it is assumed that the left area in the main scanning direction with the change point as a reference is called a first area and the right area is called a second area. In the case of the dither matrix of the present embodiment, the halftone dots of the same kind (shape) are formed in the first area and the second area respectively. That is, the halftone dots whose each pixel value of their constituent pixels is the same and having respective patterns in which the orders of the vertical pixel values (in the sub scanning direction) are opposite to each other are generated in the areas, respectively. In the following, how the results of the pseudo high-resolution processing differ between the dither matrix of the present embodiment shown in FIG. 8A and the conventional common dither matrix shown in FIG. 8B is explained by using a specific example.

Figure 11A:
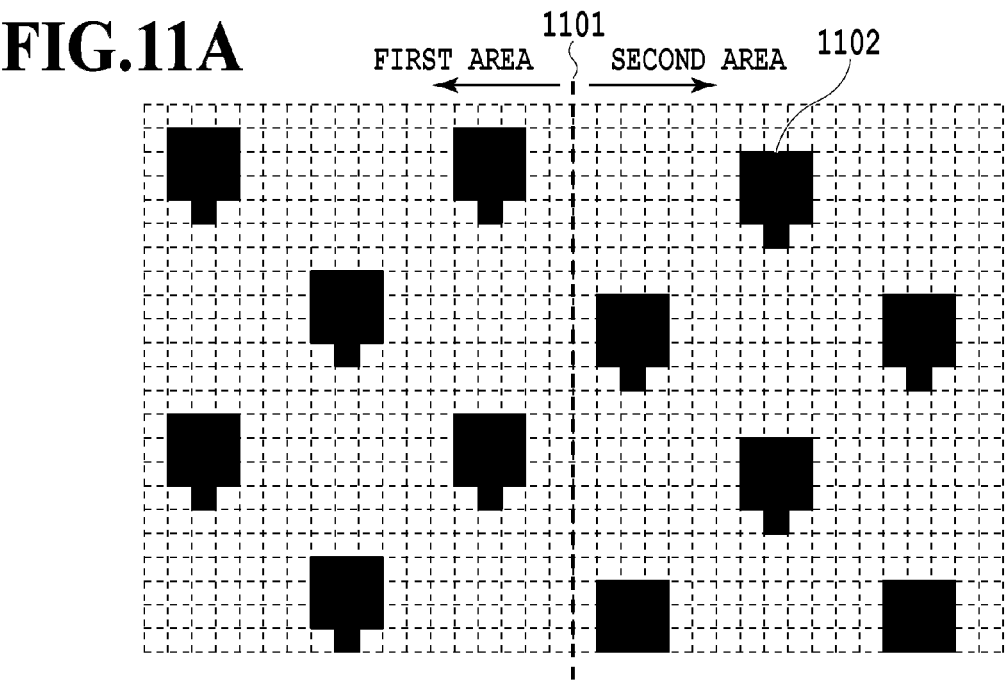
FIG. 11A is a diagram showing binary bitmap data after performing phase change processing for bitmap data obtained by using the common dither matrix and FIG. 11B is a diagram showing multivalued bitmap data after performing pseudo high-resolution processing for the binary bitmap data.
Figure 11B:
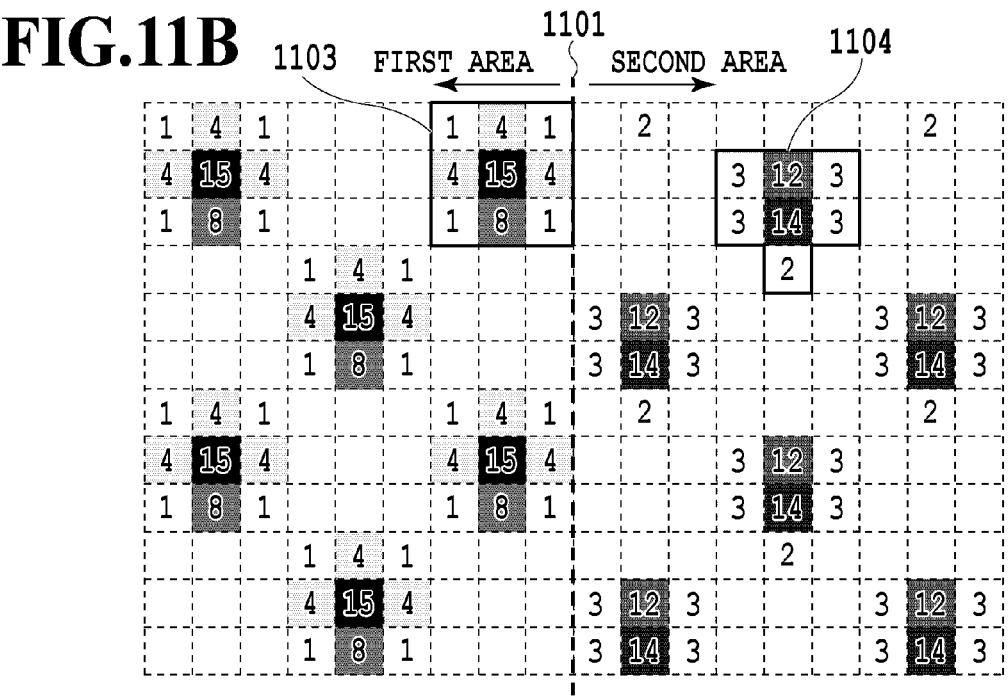

First, the halftone dot that is formed by the common dither matrix shown in FIG. 8B grows by one pixel each time around the center (center of gravity) of the halftone dot as an axis. FIG. 10A to FIG. 10E are each a diagram showing the growth process of the halftone dot by the common dither matrix. The halftone dots in FIG. 10A to FIG. 10E correspond to the density value "1", the density value "20", the density value "28", the density value "36", and the density value "48", respectively, like the halftone dots in FIG. 9A to FIG. 9E described previously. Then, each halftone dot corresponding to each density value has a pixel configuration in which growth takes place by one pixel each time with the center of gravity of the halftone dot as an axis as described above and the number of ON pixels in the sub scanning direction is not always even (in all the halftone dots except for that in FIG. 10B, there exists a column whose number of ON pixels in the sub scanning direction is odd). FIG. 11A shows binary bitmap data (1,200 dpi) after performing the screen processing using the common dither matrix in FIG. 8B for the image data whose all density values are uniformly "36" and then performing the phase change processing. In FIG. 11A, a broken line 1101 is the change point at which the line should be shifted by one pixel downward in the sub scanning direction (see the change point P$_4$ in FIG. 5B). It is known that the halftone dot within the second area is shifted by one pixel (one line) downward in the sub scanning direction with the change point 1101 as a boundary. Then, in the first area and the second area, a halftone dot 1102 of the same kind (shape) made up of ten ON pixels is arranged repeatedly. FIG. 11B is multivalued bitmap data (600 dpi) after performing the pseudo high-resolution processing for the binary bitmap data (1,200 dpi) after the phase change processing shown in FIG. 11A. In FIG. 11B, a square halftone dot indicated by a frame 1103 is arranged repeatedly in the first area and a halftone dot in the shape protruding downward indicated by a frame 1104, which is different from the halftone dot in the first area, is arranged repeatedly in the second area, respectively. That is, in the multivalued bitmap data after the pseudo high-resolution processing shown in FIG. 11B, the pixel configuration of the halftone dot that appears in the first area is different from that in the second area with the change point 1101 as a boundary. Because of this, the multicolored toner image that is formed on a printing medium by the printer unit 105 is different with the change point 1101 as a boundary. That is, between the first area and the second area with the change point 1101 as a reference, the image that is reproduced on the printing medium differs in the density and hue, and as result of this, the degradation of image quality surfaces. As described above, in the case where the multivalued bitmap data is obtained by performing the pseudo high-resolution processing after performing the phase change processing for the binary bitmap data for which the screen processing has been performed by using the common dither matrix, the degradation of image quality is caused.

Figure 12A:
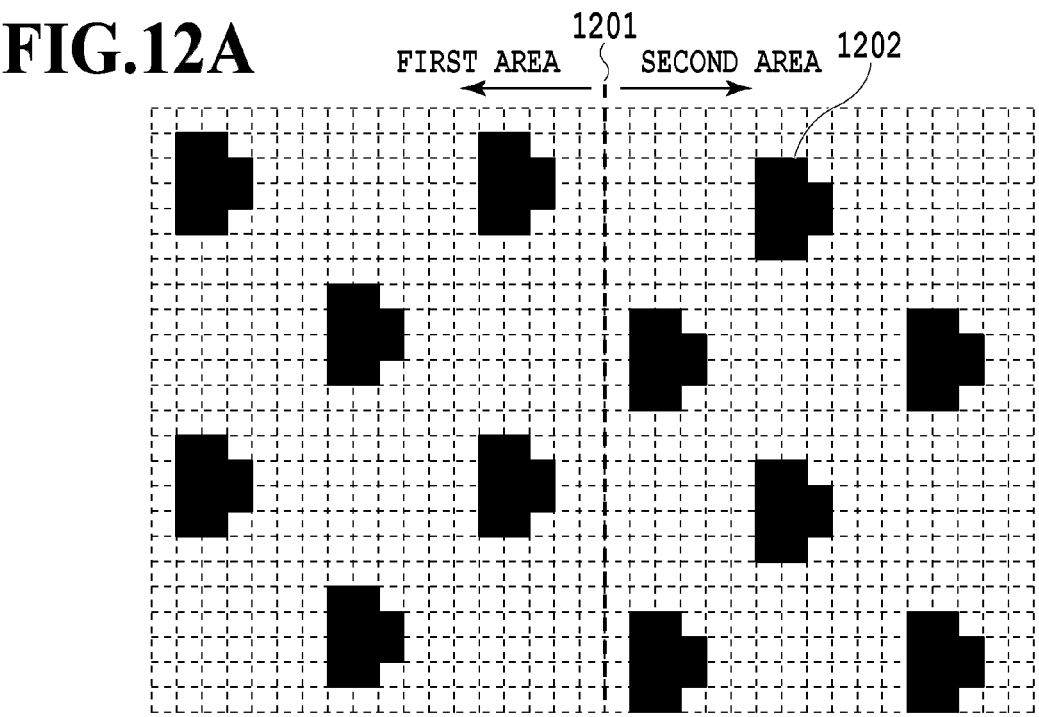
FIG. 12A is a diagram showing binary bitmap data after performing phase change processing for bitmap data obtained by using the dither matrix of the first embodiment and FIG. 12B is a diagram showing multivalued bitmap data after performing pseudo high-resolution processing for the binary bitmap data.
Figure 12B:
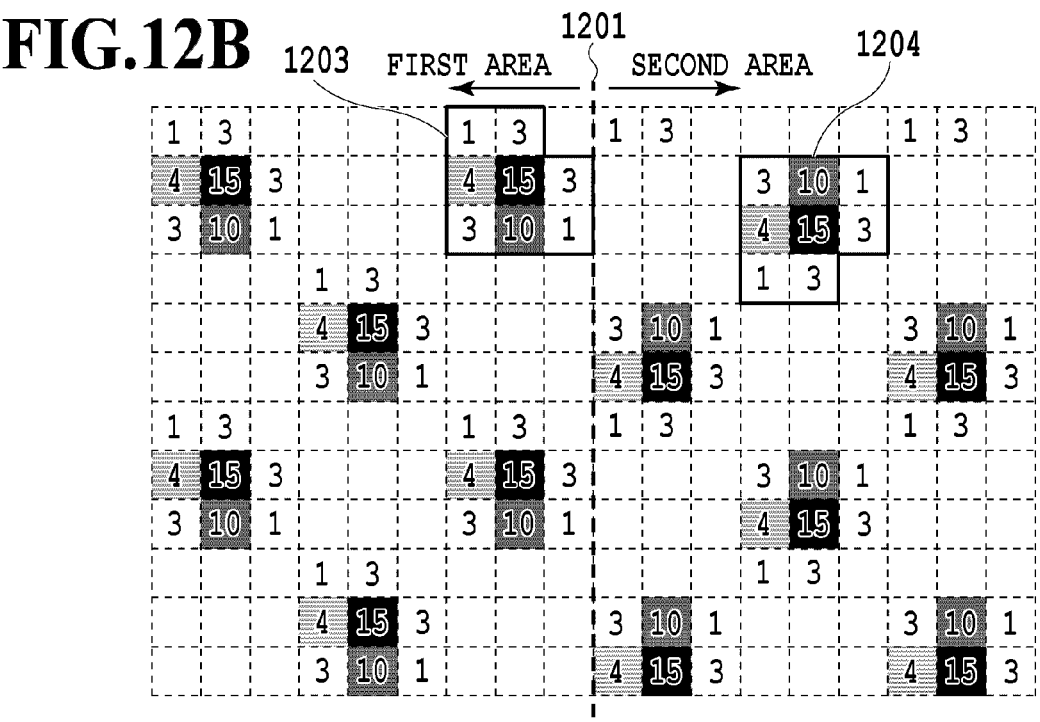

FIG. 12A shows binary bitmap data (1,200 dpi) obtained by performing the screen processing by using the dither matrix according to the present embodiment in FIG. 8A for the image data whose all the density values are uniformly "36" and then performing the phase change processing. In FIG. 12A, a broken line 1201 is the change point at which the line should be shifted by one pixel downward in the sub scanning direction. As in FIG. 11A, the halftone dot within the second area is shifted by one pixel (one line) downward in the sub scanning direction with the change point 1201 as a boundary. Then, a halftone dot 1202 common to the first area and the second area, which is made up of ten ON pixels and has the same shape, is arranged repeatedly in accordance with the dither matrix in FIG. 8A. FIG. 12B shows multivalued bitmap data (600 dpi) after performing the pseudo high-resolution processing for the binary bitmap data (1,200 dpi) after the phase change processing shown in FIG. 12A. In FIG. 12B, a halftone dot indicated by a frame 1203 is arranged repeatedly in the first area and a halftone dot indicated by a frame 1204 is arranged repeatedly in the second area, respectively.

Here, in the halftone dot 1203 within the first area, each pixel value of the constituent pixels is "1, 4, 3" from top in the first column, "3, 15, 10" from top in the second column, and "0, 3, 1" from top in the third column. On the other hand, in the halftone dot 1204 within the second area, each pixel value of the constituent pixels is "3, 4, 1" from top in the first column, "10, 15, 3" from top in the second column, and "1, 3, 0" from top in the third column. That is, although the order of the pixel values is reversed vertically in the sub scanning direction between the first area and the second area, it is known that the halftone dots all made up of the pixels having common pixel values are formed. As described above, in the case where the dither matrix (dither matrix having threshold values so that the number of pixels in the sub scanning direction, which make up the halftone dot, is always even) according to the present embodiment is used, the kind (shape) of the halftone dot that appears in the first area and the second area adjacent to each other with the change point as a boundary is the same. Consequently, on a printing medium, the halftone dot is reproduced with the same density and hue both in the first area and in the second area sandwiching the change point, and therefore, it is possible to suppress the degradation of image quality.

Regarding this point, in the technique disclosed in Japanese Patent Laid-Open No. 2013-236180 also, by limiting the two vector components representing the period of halftone dot to the combination of an even number and an odd number, it is possible to suppress the change in density from occurring before and after the phase change processing. Specifically, with a dither matrix in which the period of halftone dot represented by two vectors u and v having the distances between halftone dots in the main scanning direction and in the sub scanning direction as vector components satisfies any of the following four conditions, it is possible to obtain the same effect as that of the present embodiment. Here, both the components (x, y) of the vector are integers, x represents the main scanning direction component, and y represents the sub scanning direction component.

Figure 13A:
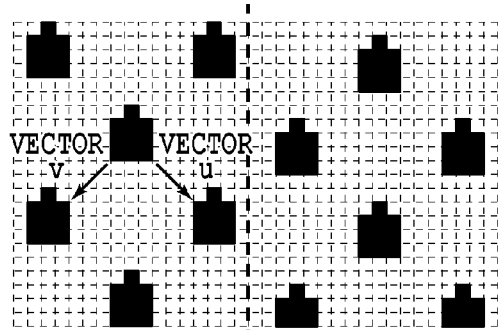
FIG. 13A to FIG. 13C are diagrams explaining a difference from Japanese Patent Laid-Open No. 2013-236180.
Figure 13B:
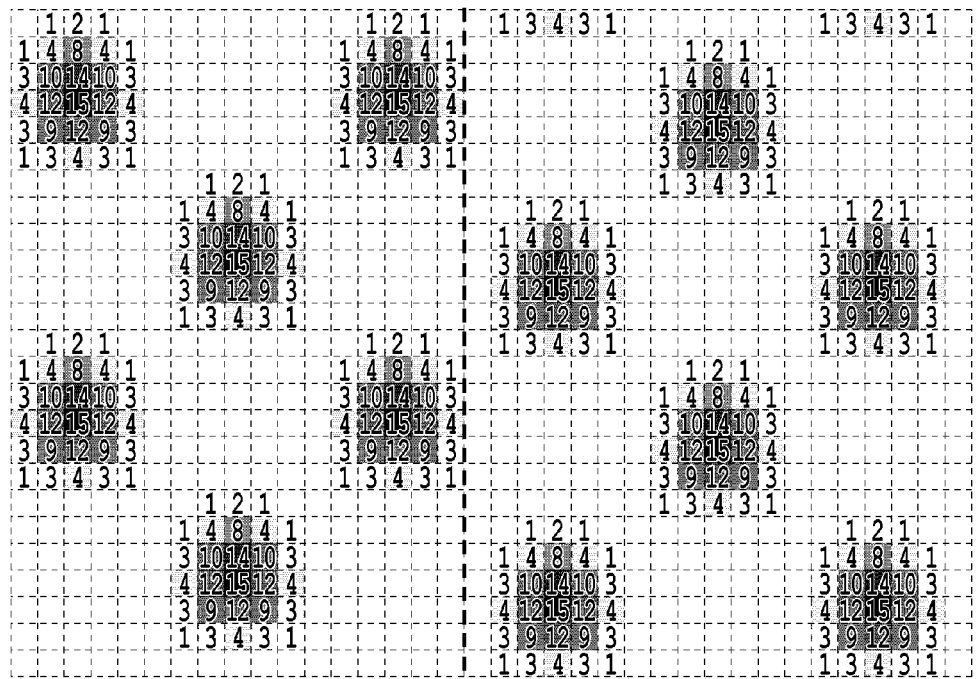
Figure 13C:
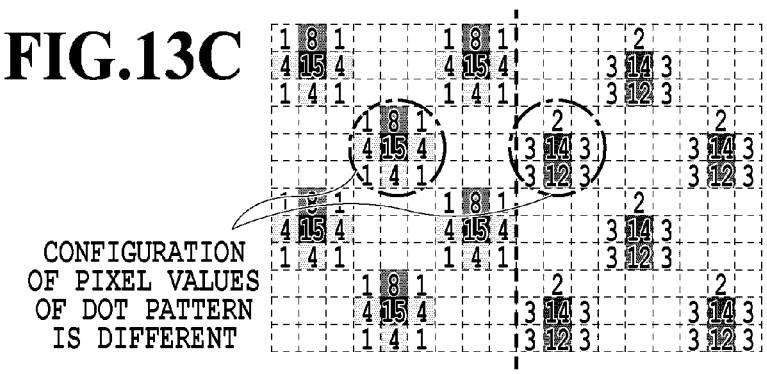

The sub scanning direction components of u and v are an odd number and an even number, respectively, and the main scanning direction component of the vector whose sub scanning direction component is an odd number is an even number The sub scanning direction components of u and v are an odd number and an even number, respectively, and both the main scanning direction components of u and v are odd numbers Both the sub scanning direction components of u and v are odd numbers and both the main scanning direction components of u and v are even numbers Both the sub scanning direction components of u and v are odd numbers and the main scanning direction components of u and v are an odd number and an even number In the case where the dither matrix satisfies any of the above-described four conditions, the kind (shape) of the halftone dot is not changed with the change point as a boundary even by performing the pseudo high-resolution processing for the image data for which the halftone processing and the phase change processing have been performed. However, in the case of the dither matrix (screen ruling: 141 lpi, screen angle: 45 degrees) having the period of halftone dot represented by the two vector components u and v, for example, shown in FIG. 3A, any of the above-described four conditions is not satisfied, and therefore, it is not possible to apply Japanese Patent Laid-Open No. 2013-236180. FIG. 13B shows a state where a 3×3 filter has been applied to the binary bitmap data (1,200 dpi) after the phase change processing shown in FIG. 13A to convert the binary bitmap data into multivalued (16-valued) bitmap data, and FIG. 13C shows a state where sampling has been performed for every two pixels in the vertical direction and in the horizontal direction for the multivalued bitmap data to convert the resolution into 600 dpi. From a comparison between the halftone dot within the first area and the halftone dot within the second area, it is known that the pixel values of the pixels making up the halftone dot within the first area are different from those within the second area. A table shown below lists examples of the dither matrixes that do not satisfy the four conditions in the method of Japanese Patent Laid-Open No. 2013-236180 and with all these dither matrixes, it is not possible to obtain the effect of Japanese Patent Laid-Open No. 2013-236180.

TABLE 1

In the case where the resolution is 1,200 dpi, the ruling is 120 to 180, and the angle is 0 to 45°

| Ruling (lpi) | Angle | Vector u | Vector v |
| --- | --- | --- | --- |
| 150 | 0 | (8, 0) | (0, 8) |
| 120 | 0 | (10, 0) | (0, 10) |
| 146 | 14 | (8, 2) | (−2, 8) |
| 166 | 34 | (6, 4) | (−4, 6) |
| 134 | 27 | (8, 4) | (−4, 8) |
| 166 | 56 | (4, 6) | (−6, 4) |
| 141 | 45 | (6, 6) | (−6, 6) |
| 120 | 37 | (8, 6) | (−6, 8) |
| 150 | 90 | (0, 8) | (−8, 0) |
| 146 | 76 | (2, 8) | (−2, 8) |
| 134 | 63 | (4, 8) | (−4, 8) |
| 120 | 53 | (6, 8) | (−6, 8) |
| 120 | 90 | (0, 10) | (−10, 0) |

Regarding this point, there are no restrictions on the screen ruling and the screen angle of the dither matrix of the present embodiment. Because of this, there is an advantage that the method has a higher versatility and a wider application range than those of the method disclosed in Japanese Patent Laid-Open No. 2013-236180.

As explained above, in the present embodiment, the screen processing is performed by using the dither matrix having threshold values so that the number of pixels in the sub scanning direction, which make up a halftone dot, is always even. As a result of this, it is possible to reproduce a stable halftone dot with less unevenness in color before and after the boundary of the change point even by performing the phase change processing to correct the bend of the laser beam scan line for high-resolution image data and then performing the pseudo high-resolution processing. Further, the screen ruling and the screen angle of an applicable dither matrix are not restricted.

Second Embodiment

The dither matrix of the first embodiment is a dither matrix having threshold values so that a halftone dot to be reproduced is always made up of an even number of pixels in the sub scanning direction. In this case, the pixels always turn on in twos (the pixels become ON pixels in twos), and therefore, a so-called gradation skip that may occur in the case where a halftone dot is connected with an adjacent halftone dot is more likely to occur compared to the common dither matrix and the degree of the gradation skip becomes large. Consequently, an aspect is explained as a second embodiment in which a dither matrix that takes into consideration the problem of the gradation skip is used. The second embodiment is the same as the first embodiment except for the dither matrix used for the halftone processing, and therefore, in the following, the dither matrix, which is the different point, and the halftone dot formed by the dither matrix are explained.

Figure 14:
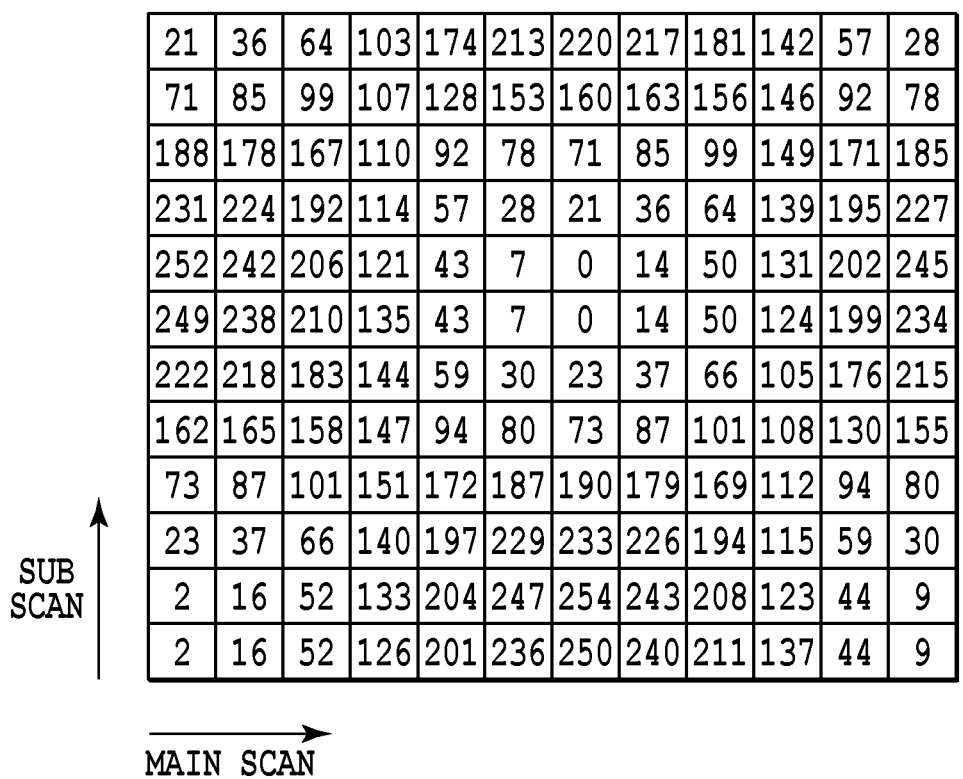
FIG. 14 is a diagram showing an example of a dither matrix according to a second embodiment.

FIG. 14 shows an example of the dither matrix according to the present embodiment. In the dither matrix of the present embodiment, until the halftone dot size becomes a specific size, threshold values are arranged so that the number of pixels in the sub scanning direction, which make up the halftone dot, is always even as in the first embodiment. However, in the case where the halftone dot size exceeds a specific size (in the present embodiment, the number of pixels in the sub scanning direction is six), threshold values are arranged to that the halftone dot grows by one pixel each time with the center of gravity of the halftone dot as an axis as in a common dither matrix.

Figure 15A:
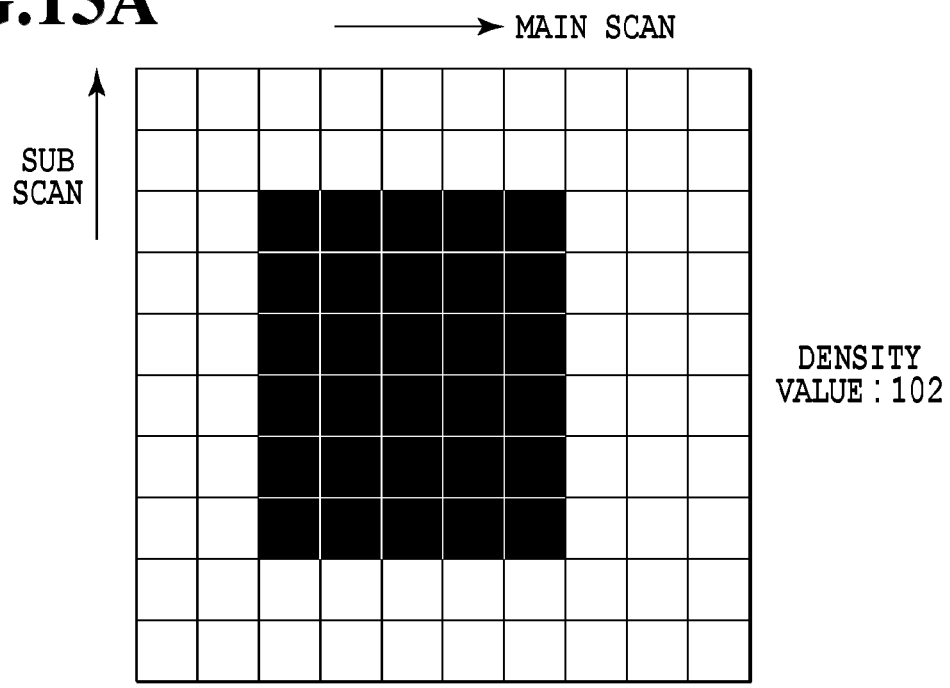
FIG. 15A and FIG. 15B are diagrams explaining the way a growth process of a halftone dot formed by the dither matrix according to the second embodiment switches to another.
Figure 15B:
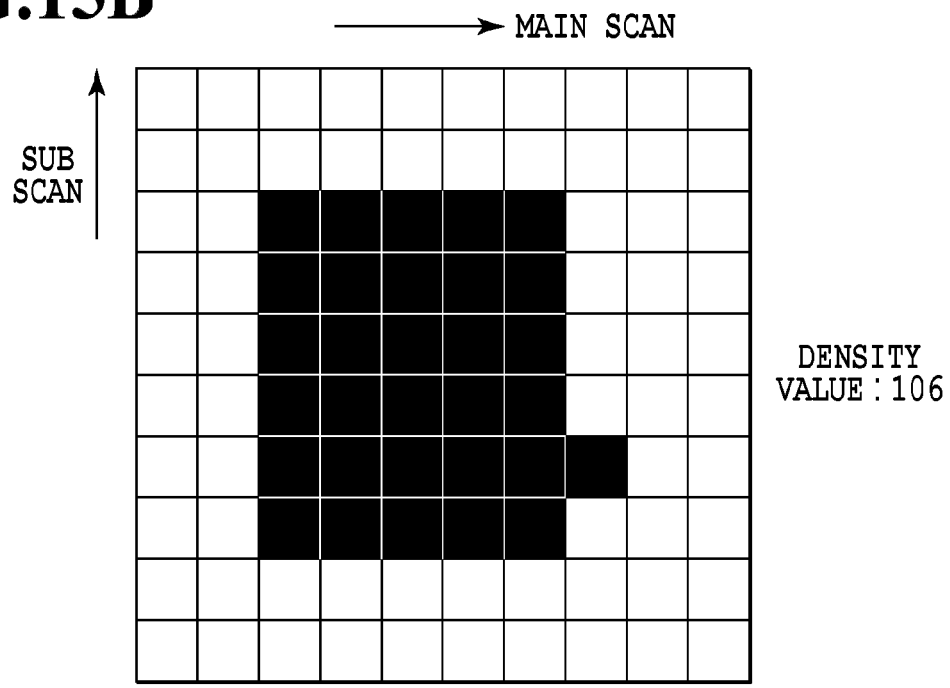

FIG. 15A and FIG. 15B are diagrams explaining the way the growth of the halftone dot formed by the dither matrix shown in FIG. 14 switches to another. The halftone dot in FIG. 15A is the halftone dot in the case where the density value of all the pixels of the image data is "102" and made up of 30 pixels in total, i.e., five pixels in the main scanning direction and six pixels in the sub scanning direction. In the case where the halftone dot size has grown to this degree, in the multivalued halftone dot after the pseudo high-resolution processing is performed, the pixels of the maximum tone level (solid portion) are centralized at the center of the halftone dot, and therefore, the influence of the halftone pixel at the edge of the halftone dot on the fluctuations in density becomes small. Consequently, the gradation skip is prevented from occurring or the degree of the gradation skip is reduced in the case where adjacent halftone dots are connected by arranging threshold values so that the halftone dot grows by one pixel each time as conventionally after the halftone dot size exceeds a predetermined size.

The halftone dot in FIG. 15B is a halftone dot that is formed immediately after the halftone dot size exceeds a predetermined size (here, the number of pixels in the sub scanning direction is six), and is a halftone dot in the case where the density value of all the pixels of the image data is "106". From a comparison with the halftone dot shown in FIG. 15A, it is known that only one pixel, which is the seventh pixel from top in the third column from the right, has changed into the ON pixel. In this manner, in the case of the dither matrix of the present embodiment, in the stage where the halftone dot size exceeds a predetermined size, the halftone dot is caused to grow by one pixel each time around the center (center of gravity) of the halftone dot to be reproduced as an axis as in a common dither matrix. That is, after the halftone dot size exceeds a predetermined size, the halftone dot is formed with a pixel configuration in which a column whose height (number of pixels in the sub scanning direction) corresponds to an odd number of pixels appears.

As above, the dither matrix of the present embodiment has threshold values so that the halftone dot is always made up of an even number of pixels in the sub scanning direction until the halftone dot size become a specific size and after the halftone dot size exceeds the specific size, the halftone dot grows by one pixel each time with the center of gravity of the halftone dot as an axis. By performing the halftone processing by using the dither matrix such as this, it is also made possible to prevent the gradation skip from occurring while suppressing the degradation of image quality due to the execution of the pseudo high-resolution conversion processing after the phase change processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the case where the resolution is converted into a low resolution by the pseudo high-resolution processing after performing the halftone processing and the phase change processing with a high resolution, it is possible to suppress unevenness in color from occurring without restrictions on the screen ruling and the angle of the dither matrix.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-007999, filed Jan. 19, 2016, which is hereby incorporated by reference wherein in its entirety.

What is claimed is:

1. An image processing apparatus comprising:
a halftone processing unit configured to generate halftone image data with a first resolution by performing halftone processing based on a result of comparison between a pixel value of a pixel for image data having the first resolution and a threshold value of a dither matrix; and
a resolution conversion unit configured to convert the first resolution of the halftone image data into a second resolution which is half of the first resolution,
wherein the dither matrix is composed of a plurality of columns aligned along a main scanning direction and a plurality of rows aligned along a sub scanning direction, each of the columns and each of the rows including a plurality of threshold values having multivalues, the plurality of columns including at least one column having duplicated threshold values and the plurality of rows including at least an odd-number row and an even-number row having the same duplicated threshold values.

2. The image processing apparatus according to claim 1, wherein the same duplicated threshold value is a threshold value less than or equal to a predetermined value.

3. The image processing apparatus according to claim 1, wherein the odd-number row and the even-number row are adjacent to each other in the sub scanning direction.

4. The image processing apparatus according to claim 2, wherein a threshold value greater than the predetermined value, among the plurality of threshold values, is arranged singly in the dither matrix.

5. The image processing apparatus according to claim 1, wherein the first resolution of the halftone image data is converted into halftone image data of the second resolution by performing a product sum operation using a multivalued filter.

6. The image processing apparatus according to claim 1, wherein the halftone image data of the first resolution generated by the halftone processing unit is binary bitmap data and the halftone image data of the second resolution generated by the resolution conversion unit is multivalued bitmap data whose number of values is greater than two.

7. The image processing apparatus according to claim 1, further comprising a correction unit configured to shift a pixel in the halftone image data in a sub scanning direction based on correction information for correcting a deviation of a scan line that forms an image based on the halftone image data.

8. The image processing apparatus according to claim 7, wherein the halftone image data with the second resolution after the resolution conversion has a first area and a second area adjacent to each other in both the main scanning direction and sub scanning direction at a position at which a pixel is shifted by the correction unit, and
wherein the first area is made up of a first halftone dot pattern and the second area is made up of a second halftone dot pattern that is the first halftone dot pattern reversed in the sub scanning direction.

9. An image processing method comprising:
generating halftone image data with a first resolution by performing halftone processing based on a result of comparison between a pixel value of a pixel for image data having the first resolution and a threshold value of a dither matrix; and
converting the first resolution of the halftone image data into a second resolution which is half of the first resolution, wherein the dither matrix is composed of a plurality of columns aligned along a main scanning direction and a plurality of rows aligned along a sub scanning direction, each of the columns and each of the rows including a plurality of threshold values having multivalues, the plurality of columns including at least one column having duplicated threshold values and the plurality of rows including at least an odd-number row and an even-number row having the same duplicated threshold values.

10. The image processing method according to claim 9, wherein the same duplicated threshold value is a threshold value less than or equal to a predetermined value.

11. The image processing method according to claim 9, wherein the odd-number row and the even-number row are adjacent to each other in the sub scanning direction.

12. The image processing method according to claim 10, wherein a threshold value greater than the predetermined value, among the plurality of threshold values, is arranged singly in the dither matrix.

13. The image processing method according to claim 9, wherein the first resolution of the halftone image data is converted into halftone image data of the second resolution by performing a product sum operation using a multivalued filter.

14. The image processing method according to claim 9, wherein the generated halftone image data of the first resolution is binary bitmap data and the converted halftone image data of the second resolution is multivalued bitmap data whose number of values is greater than two.

15. The image processing method according to claim 9, further comprising shifting a pixel in the halftone image data in a sub scanning direction based on correction information for correcting a deviation of a scan line that forms an image based on the halftone image data.

16. The image processing method according to claim 15, wherein the halftone image data with the second resolution after the resolution conversion has a first area and a second area adjacent to each other in both the main scanning direction and sub scanning direction at a position at which a pixel is shifted, and
wherein the first area is made up of a first halftone dot pattern and the second area is made up of a second halftone dot pattern that is the first halftone dot pattern reversed in the sub scanning direction.

17. A non-transitory computer readable storage medium storing a program for causing a computer to perform an image processing method comprising:
generating halftone image data with a first resolution by performing halftone processing based on a result of comparison between a pixel value of a pixel for image data having the first resolution and a threshold value of a dither matrix; and
converting the first resolution of the halftone image data into a second resolution which is half of the first resolution,
wherein the dither matrix is composed of a plurality of columns aligned along a main scanning direction and a plurality of rows aligned along a sub scanning direction, each of the columns and each of the rows including a plurality of threshold values having multivalues, the plurality of columns including at least one column having duplicated threshold values and the plurality of rows including at least an odd-number row and an even-number row having the same duplicated threshold values.

* * * * *